(12) United States Patent
Moore

(10) Patent No.: US 9,137,103 B2
(45) Date of Patent: Sep. 15, 2015

(54) CONFIGURING DEVICES IN A SECURED NETWORK

(75) Inventor: Keith E. Moore, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1673 days.

(21) Appl. No.: 11/796,912

(22) Filed: Apr. 30, 2007

(65) Prior Publication Data

US 2008/0271131 A1 Oct. 30, 2008

(51) Int. Cl.
*H04L 29/06* (2006.01)
*H04L 12/24* (2006.01)

(52) U.S. Cl.
CPC ............ *H04L 41/0806* (2013.01); *H04L 63/08* (2013.01)

(58) Field of Classification Search
USPC ............................................................ 726/9
See application file for complete search history.

(56) References Cited

U.S. PATENT DOCUMENTS

| | | | |
|---|---|---|---|
| 6,493,760 B1 * | 12/2002 | Pendlebury et al. | 709/229 |
| 7,710,587 B2 * | 5/2010 | Crosier et al. | 358/1.15 |
| 7,797,537 B2 * | 9/2010 | Kurita et al. | 713/169 |
| 2005/0154925 A1 * | 7/2005 | Chitrapu et al. | 713/202 |
| 2007/0011724 A1 * | 1/2007 | Gonzalez et al. | 726/4 |
| 2007/0016941 A1 * | 1/2007 | Gonzalez et al. | 726/9 |
| 2007/0118891 A1 * | 5/2007 | Buer | 726/8 |
| 2007/0199057 A1 * | 8/2007 | Plummer | 726/9 |
| 2008/0195750 A1 * | 8/2008 | Sadovsky et al. | 709/234 |
| 2008/0198860 A1 * | 8/2008 | Jain et al. | 370/401 |
| 2009/0313689 A1 * | 12/2009 | Nystrom et al. | 726/9 |

OTHER PUBLICATIONS

Peter Judge, "The Touching Story of NFC," Sep. 2006, http://www.techworld.com/mobility/features/index.cfm?featureid=2828.
Declaration of Keith E. Moore.
Judge, Peter, "The Touching Story of NFC", TechWorld [Online], <http://features.techworld.com/mobile-wireless/2828/the-touching-story-of-nfc/> Sep. 25, 2006.

* cited by examiner

*Primary Examiner* — Amare F Tabor
(74) *Attorney, Agent, or Firm* — PatentEsque Law Group

(57) ABSTRACT

An exemplary method for configuring a device to enable it to become a member of an established network comprises reading, using a portable device, a first token of a networked device, obtaining configuration data based on the first token, reading a second token of a non-networked device, establishing a communication session with the non-networked device based on the second token, and providing the configuration data to the non-networked device to enable it to become a member of the same network as the networked device.

16 Claims, 4 Drawing Sheets

CONFIGURING DEVICES IN A SECURED NETWORK

BACKGROUND

In a typical secured network environment (e.g., a home secured network, a business secured network, etc.), multiple devices can share resources and data within the network. In order for a new device to be accepted in an established network (e.g., as a member of the network, to have access to data on the network, etc.), the device generally has to be configured with specific configuration data. Configuration data may include one or more of security keys, passwords, security settings, login credentials, IP addresses, and/or other data. Configuration data can be manually entered into the new device by a user via a user interface.

Alternatively, a physical dongle (e.g., a USB dongle) can be used to transfer configuration data to the new device. For example, a USB dongle may be inserted into a USB port at a networked server device. Next, a user may invoke an application at the server via a user interface. The invoked application may enable the server to download configuration data onto the USB dongle. The user can then carry the USB dongle to the new device and upload the configuration data onto the new device. Because the USB dongle is a passive device and generally cannot authenticate itself to the server, the server typically downloads only enough configuration data (e.g., a single security key) for configuring one new device at a time.

Thus, a market exists for a method to efficiently configure multiple devices in a networked environment using a trusted and active device.

SUMMARY

An exemplary method for configuring a device to enable it to become a member of an established network comprises reading, using a portable device, a first token of a networked device, obtaining configuration data based on the first token, reading a second token of a non-networked device, establishing a communication session with the non-networked device based on the second token, and providing the configuration data to the non-networked device to enable it to become a member of the same network as the networked device.

Other embodiments and implementations are also described below.

DETAILED DESCRIPTION

I. Overview

Exemplary processes and systems for configuring devices in a networked environment are described.

Section II describes an exemplary system for configuring devices in a networked environment.

Section III describes exemplary processes for configuring devices in a networked environment.

Section IV describes an exemplary computing environment.

II. An Exemplary System for Configuring Devices in a Networked Environment

Figure 1:
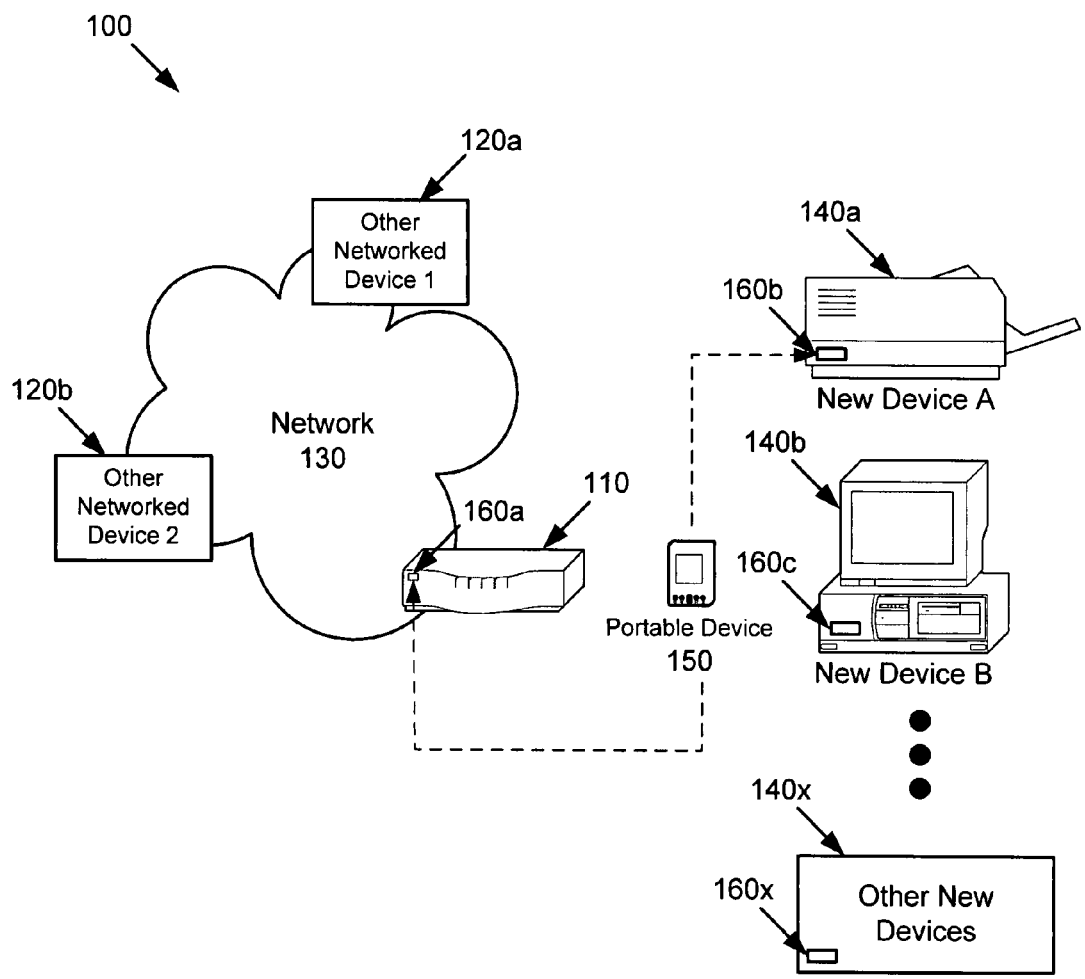
FIG. 1 illustrates an exemplary system for configuring devices in a networked environment.

FIG. 1 illustrates an exemplary system 100 for configuring devices in a networked environment. The system 100 includes a router 110 connected to multiple other devices 120 in a network 130. The system 100 also includes multiple new devices 140 to be added to the network 130 and a portable device 150 for obtaining configuration data from the router 110 (or other networked devices) and providing the configuration data to the new devices 140 in a secured manner.

In an exemplary implementation, the router 110 includes a configuration token 160a. Likewise, each of the new devices 140a-140x also has a configuration token 160b-160x. Depending on design choice, the configuration token 160 may be implemented as a physical tag affixed to the housing of a device or otherwise. The configuration token 160 may be implemented as a radio-frequency identification (RFID), a near-field identification (NFID), a barcode, and/or other identifiers. In general, the configuration token 160 may contain any data or identification information depending on design choice. In an exemplary implementation, the configuration token may contain the configuration data required to add any new devices 140 onto the network 130. In another exemplary implementation, the configuration token may include information leading to the actual location of the configuration data. In yet another exemplary implementation, the configuration token may include an identifier of a device (e.g., the media access control (MAC) address of a new device).

The portable device 150 may be a cell phone, a personal digital assistant (PDA), and/or any other portable device that includes a processor which can be enabled to initiate communication with a computing device. For example, an application may be uploaded onto a portable device 150 as firmware or may be later-installed by a user. The application may enable the portable device 150 to perform the processes described herein (when the application is executed by the processor within the portable device).

The new devices 140 may be any new electronic devices. For example, and without limitation, the new devices 140 may include a printer, a desk top computer, a laptop computer, a scanner, a television set, a home entertainment center, and/or any other devices.

III. Exemplary Processes for Configuring Devices in a Networked Environment

Figure 2:
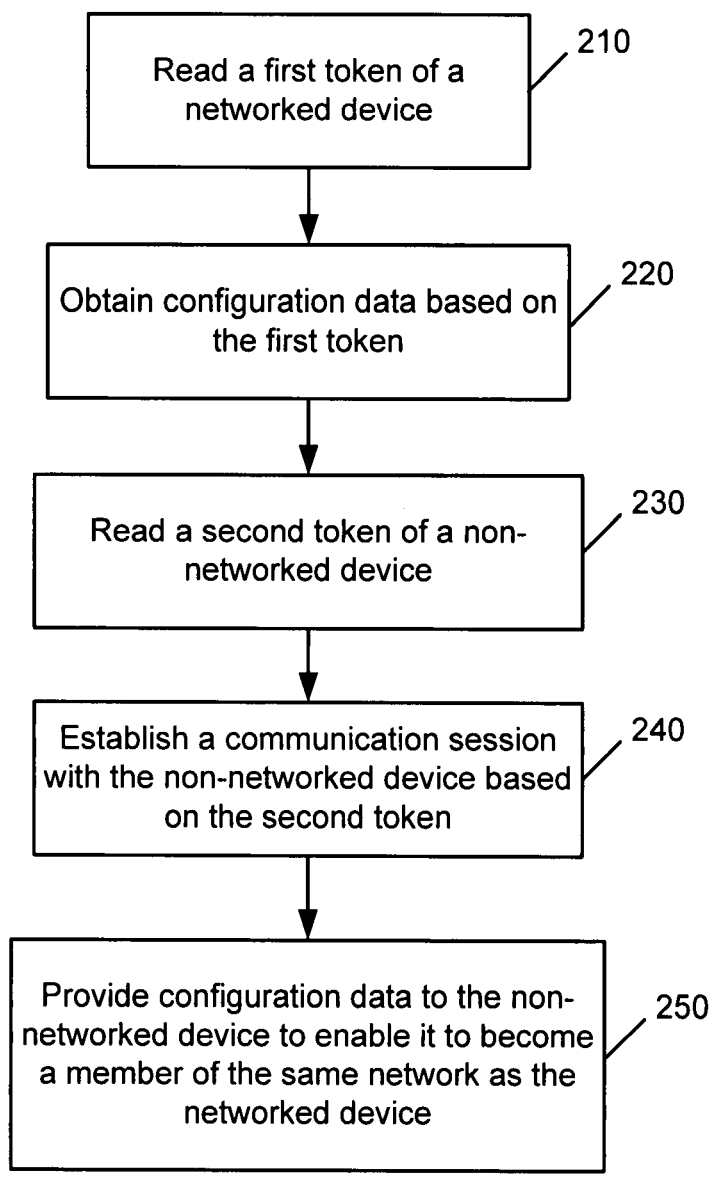
FIG. 2 illustrates an exemplary process for configuring devices in a networked environment.

FIG. 2 illustrates an exemplary process for configuring new devices in a networked environment. For ease of explanation, the process steps to follow may refer to components illustrated in FIG. 1.

At step 210, the portable device 150 reads a first token of a networked device. In an exemplary implementation, the portable device 150 reads the configuration token 160a of the router 110. In one implementation, the configuration token 160a is implemented as a NFID and the portable device 150 is moved to within a few millimeters of the token 160a to read the data stored on the token. Near field communication is a wireless connectivity technology that enables convenient short-range communication between near-field enabled devices. Near field communication works by magnetic field induction and currently operates within globally available and unlicensed radio frequency (RF) band of 13.56 MHz. Depending on specific implementation, the typical working distance for near field communication can be between 0 to 20 centimeters (or other ranges as the technology evolves). In general, near field communication may operate in either a passive communication mode or an active communication mode. In the passive communication mode, the initiating device provides a carrier field and the target device responds by modulating an existing field. In this mode, the target device may draw its operating power from the initiator-provided electromagnetic field. In active communication mode, both the initiating and target devices communicate by generating their own magnetic field. In this mode, both devices typically need to have a power supply. Near field communication can be used to configure and initiate other wireless network connections known in the art such as Bluetooth, Wi-Fi, or Ultra-wideband. This technology is well known in the art and need not be described in more detail herein.

At step 220, the portable device 150 obtains configuration data based on the first token. An exemplary process for obtaining configuration data based on the configuration token will be described in more detail with reference to FIG. 3.

At step 230, the portable device 150 reads a second token of a non-networked (or new) device. In an exemplary implementation, the portable device 150 reads the configuration token 160*b* of new device 140*a*. In one implementation, the configuration token 160*b* is implemented as a NFID and the portable device 150 is moved to within a few millimeters of the token 160*b* to read the data stored on the token.

At step 240, the portable device 150 establishes a communication session with the non-networked device based on the second token. An exemplary process for establishing a communication session with a non-networked device for purposes of providing configuration data will be described in more detail with reference to FIG. 4.

At step 250, the portable device 150 provides the configuration data to the non-networked device to enable it to become a member of the same network as the networked device.

Figure 3:
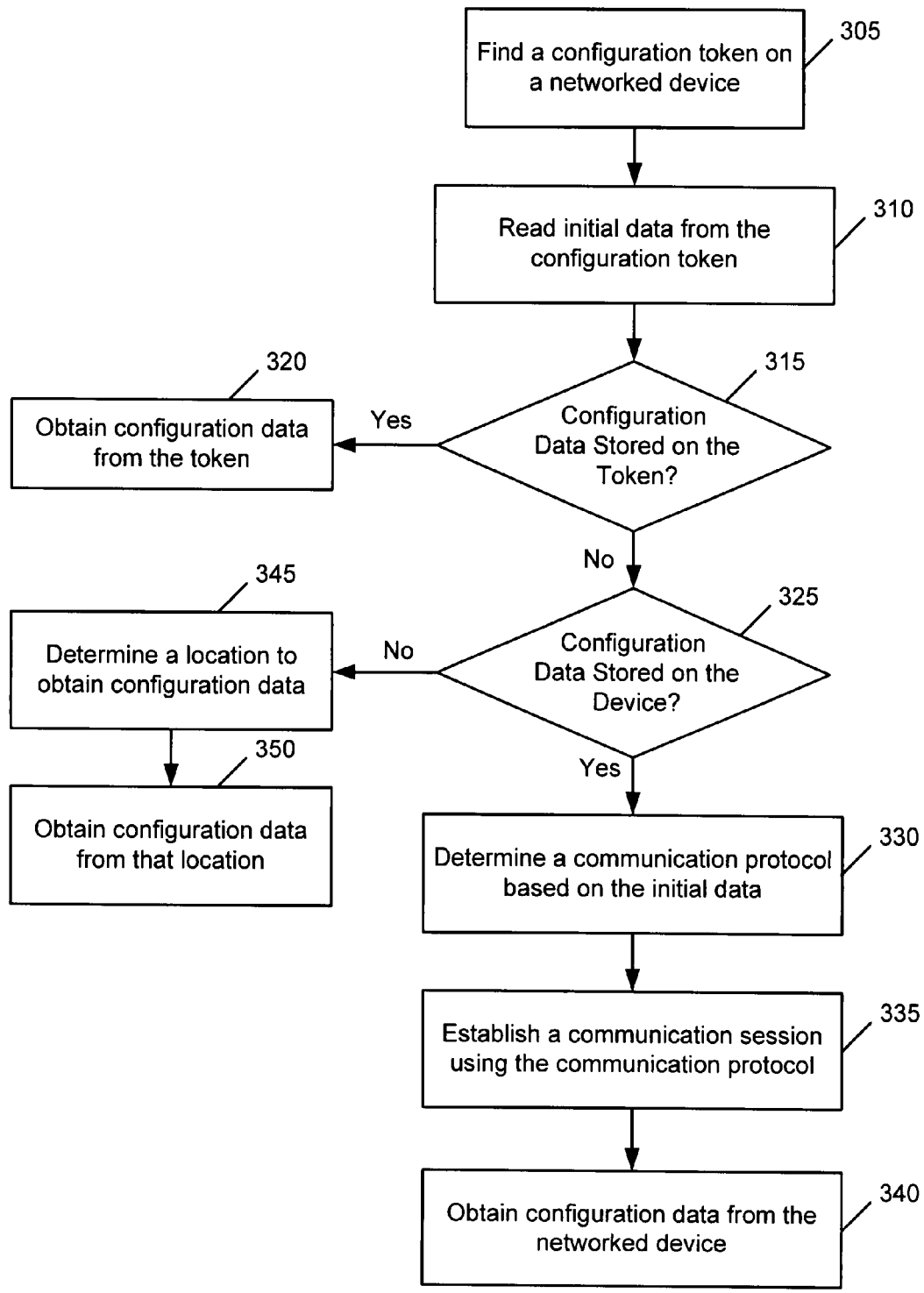
FIG. 3 illustrates an exemplary process for securely obtaining configuration data.

FIG. 3 illustrates an exemplary process for obtaining configuration data from a networked device.

At step 305, a user or a portable device locates a configuration token on a networked device (e.g., a router 110). For example, a user may visually search for the physical token affixed on a networked device. In another example, the portable device may have an embedded detector for detecting the location of the token (e.g., by beeping louder as it gets closer to the token). In yet another example, a manufacturer may implement a standard location for affixing the token (e.g., by the on/off switch or in/under the manufacturer's logo). In an exemplary implementation, the configuration token is a NFID affixed to the housing of the networked device.

At step 310, the portable device reads initial data from the configuration token. In an exemplary implementation, the portable device may include a receiver for receiving radio frequency being broadcasted by an NFID.

At step 315, the portable device determines whether the configuration data are stored on the token. Depending on implementation, some configuration tokens may have enough memory capacity to include the configuration data on the token.

At step 320, if the configuration data are stored on the token, the portable device obtains the configuration data from the token.

At step 325, if the configuration data are not stored on the token, the portable device determines whether the configuration data are stored on the networked device.

If the configuration data are stored on the networked device, at step 330, the portable device may determine a communication protocol for establishing a communication session with the networked device. For example, based on data stored in the token (e.g., NFID), the portable device may select a communication protocol supported by the networked device. Possible communications protocols include, without limitation, Bluetooth address, IP address, IR address, and/or other protocols supported by the networked device. The selection of a particular communication protocol can be implemented based on design choice.

At step 335, the portable device and the networked device establishes a communication session using the selected communication protocol. In an exemplary implementation, for a more secured data exchange, the portable device and the networked device may exchange challenge messages until trust has been established and each device is satisfied of the identity of the other. A person skilled in the art will recognize that any known authentication process can be implemented. Once authenticated, a session key may be generated (by either device) for the communication session. In an exemplary implementation, subsequent communications between the portable device and the networked device may be encrypted by the session key (or other cryptographic key) for heightened security.

At step 340, the portable device obtains configuration data from the networked device within the established communication session. The portable device is an active device (i.e., it has actively initiated a communication session) that has authenticated itself to the networked device. As a result, in an exemplary implementation, the networked device can be configured to provide, to the portable device, configuration data for configuring multiple new devices. For example, the configuration data may include multiple security keys, one for each new device.

Referring back to step 325, if the configuration data is not stored on the networked device, at step 345, the portable device may determine a remote location for obtaining the configuration data using the initial data read from the configuration token. For example, the initial data may instruct the portable device to send a text message to an address to obtain the configuration data, may instruct the portable device to go to a web site to obtain configuration data, etc. One skilled in the art will recognize that other implementations are possible depending on design choice. In an alternative implementation, the portable device may need to establish a communication session with the networked device to determine the location of the configuration data. In this case, the process may continue at step 330.

At step 350, the portable device obtains configuration data from the remote location.

Figure 4:
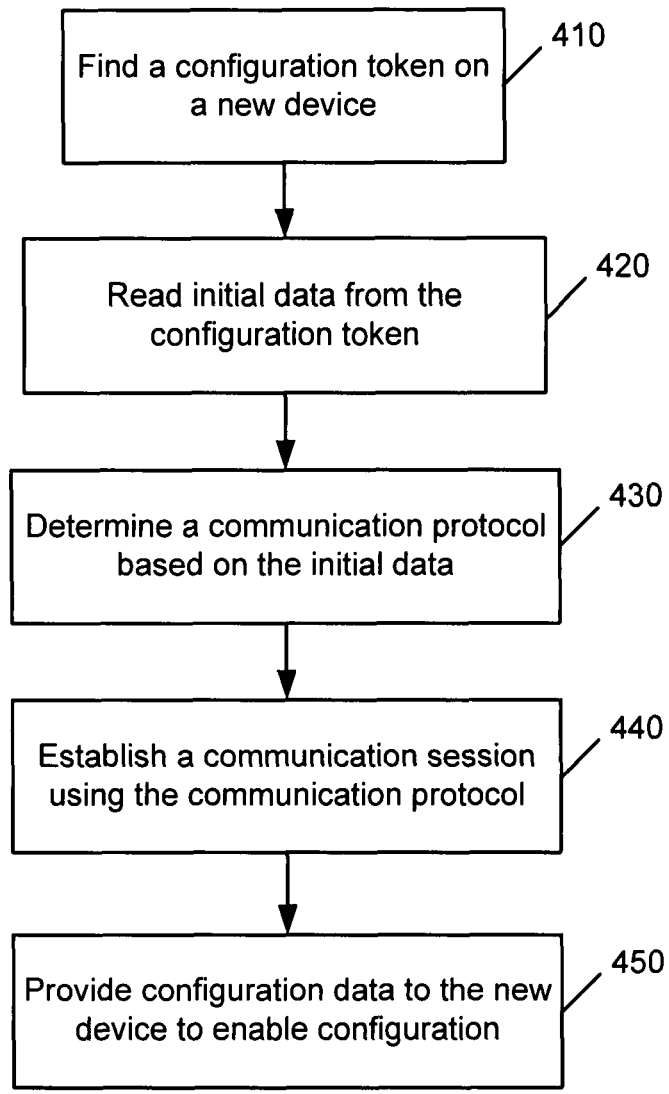
FIG. 4 illustrates an exemplary process for securely providing the configuration data to a new device.

FIG. 4 illustrates an exemplary process for configuring a new device using a portable device.

At step 410, a user or a portable device locates a configuration token on a new (non-networked) device. In an exemplary implementation, the configuration token is a NFID affixed to the housing of the new device.

At step 420, the portable device reads initial data from the configuration token. In an exemplary implementation, the portable device includes a receiver for reading the NFID.

At step 430, the portable device determines a communication protocol for establishing a communication session with the new device based on the initial data. For example, based on data stored on the token (e.g., a NFID), the portable device may select a communication protocol supported by the new device. Possible protocols include, without limitation, Bluetooth address, IP address, IR address, and/or other protocols supported by the new device.

At step 440, the portable device and the new device establishes a communication session using the selected communication protocol. In an exemplary implementation, for a more secured data exchange, the portable device and the new device may exchange challenge messages until trust has been established and each device is satisfied of the identity of the other. A person skilled in the art will recognize that any known authentication process can be implemented. Once authenticated, a session key may be generated (by either device) for the communication session. In an exemplary implementation, subsequent communications between the portable device and the new device may be encrypted by the session key (or other cryptographic key) for heightened security.

At step 450, the portable device provides the configuration data previously obtained (e.g., from a networked device) to the new device to enable it to configure itself for acceptance into the established network.

The processes described above with reference to FIGS. 2, 3, and 4 are merely exemplary. A person skilled in the art will recognize that other process steps may be implemented to allow an active device to securely obtain configuration data from one device and securely provide configuration data to a another device.

IV. An Exemplary Computing Environment

The techniques described herein can be implemented using any suitable computing environment. The computing environment could take the form of software-based logic instructions stored in one or more computer-readable memories and executed using a computer processor. Alternatively, some or all of the techniques could be implemented in hardware, perhaps even eliminating the need for a separate processor, if the hardware modules contain the requisite processor functionality. The hardware modules could comprise PLAs, PALs, ASICs, and still other devices for implementing logic instructions known to those skilled in the art or hereafter developed.

In general, then, the computing environment with which the techniques can be implemented should be understood to include any circuitry, program, code, routine, object, component, data structure, and so forth, that implements the specified functionality, whether in hardware, software, or a combination thereof. The software and/or hardware would typically reside on or constitute some type of computer-readable media which can store data and logic instructions that are accessible by the computer or the processing logic. Such media might include, without limitation, hard disks, floppy disks, magnetic cassettes, flash memory cards, digital video disks, removable cartridges, random access memories (RAMs), read only memories (ROMs), and/or still other electronic, magnetic and/or optical media known to those skilled in the art or hereafter developed.

V. Conclusion

The foregoing examples illustrate certain exemplary embodiments from which other embodiments, variations, and modifications will be apparent to those skilled in the art. The inventions should therefore not be limited to the particular embodiments discussed above, but rather are defined by the claims. Furthermore, some of the claims may include alphanumeric identifiers to distinguish the elements and/or recite elements in a particular sequence. Such identifiers or sequence are merely provided for convenience in reading, and should not necessarily be construed as requiring or implying a particular order of steps, or a particular sequential relationship among the claim elements.

What is claimed is:

1. A method comprising:
   reading, by a portable device, a first token affixed on a networked device;
   determining, by the portable device, whether configuration data is stored in the first token;
   in response to a determination that the configuration data is stored in the first token, obtaining, by the portable device, the configuration data from the first token;
   in response to a determination that the configuration data is not stored in the first token, establishing, by the portable device, an authenticated communication session with the networked device and obtaining the configuration data stored inside the networked device;
   prior to obtaining the configuration data stored inside the networked device, determining whether the configuration data is stored inside the networked device; and
   in response to a determination that the configuration data is not stored inside the network device, obtaining the configuration data from a device other than said networked device;
   reading a second token affixed on a non-networked device;
   establishing a communication session with said non-networked device based on said second token; and
   providing the configuration data to said non-networked device to enable the non-networked device to become a member of a same network as said networked device.

2. The method of claim 1, wherein reading the first token requires the portable device being in close physical proximity to the first token.

3. The method of claim 1, wherein reading the first token includes actively acquiring data from the first token.

4. The method of claim 1, wherein said first token is a near field identification token.

5. The method of claim 1, wherein establishing the authenticated communication session with said networked device includes receiving and responding to security challenges from the networked device.

6. The method of claim 1, wherein said second token is a near field identification token.

7. The method of claim 1, wherein said establishing includes receiving and responding to security challenges from said non-networked device.

8. A portable device system for configuring devices in a comprising: a processor; and
   a non-transitory computer-readable medium storing instructions that when executed cause the processor to:
   read a first token affixed on a networked device;
   determine whether configuration data is stored in the first token;
   in response to a determination that the configuration data is stored in the first token, obtain configuration data from the first token;
   in response to a determination that the configuration data is not stored in the first token, establish an authenticated communication session with the networked device and obtain the configuration data stored inside the networked device;
   prior to obtaining the configuration data stored inside the networked device, the processor is to: determine whether the configuration data is stored inside the networked device; and
   in response to a determination that the configuration data is not stored inside the network device, obtain the configuration data from a device other than the networked device;
   read a second token affixed on a non-networked device;

establish a communication session with said non-networked device based on said second token; and provide the configuration data to said non-networked device.

9. The portable device of claim 8, wherein to read the first token, the processor is to acquire data from the token.

10. The portable device of claim 8, wherein said first token is a near field identification token.

11. The portable device of claim 8, wherein said second token is a near field identification token.

12. The portable device of claim 8, wherein to establish the authenticated communication session with the networked device, the processor is to receive and respond to security challenges from said non-networked device.

13. A non-transitory computer-readable storage medium storing machine readable instructions that, when executed, cause a processor to:

read a first token affixed on a networked device; determine whether configuration data is stored in the first token;

in response to a determination that the configuration data is stored in the first token, obtain configuration data from the first token;

in response to a determination that the configuration data is not stored in the first token, establish an authenticated communication session with the networked device and obtain the configuration data stored inside the networked device;

prior to obtaining the configuration data stored inside the networked device, determine whether the configuration data is stored inside the networked device; and in response to a determination that the configuration data is not stored inside the network device, obtain the configuration data from a device other than the networked device;

read a second token affixed on a non-networked device;

establish a communication session with said non-networked device based on said second token; and provide the configuration data to said non-networked device to enable the non-networked device to become a member of a same network as said networked device.

14. The non-transitory computer-readable storage medium of claim 13, wherein said first token is a near field identification token.

15. The non-transitory computer-readable storage medium of claim 13, wherein said second token is a near field identification token.

16. The non-transitory computer-readable storage medium of claim 13, wherein said instructions for establishing includes instructions that, if executed, receive and respond to security challenges from said non-networked device.

* * * * *